Patented Jan. 27, 1953

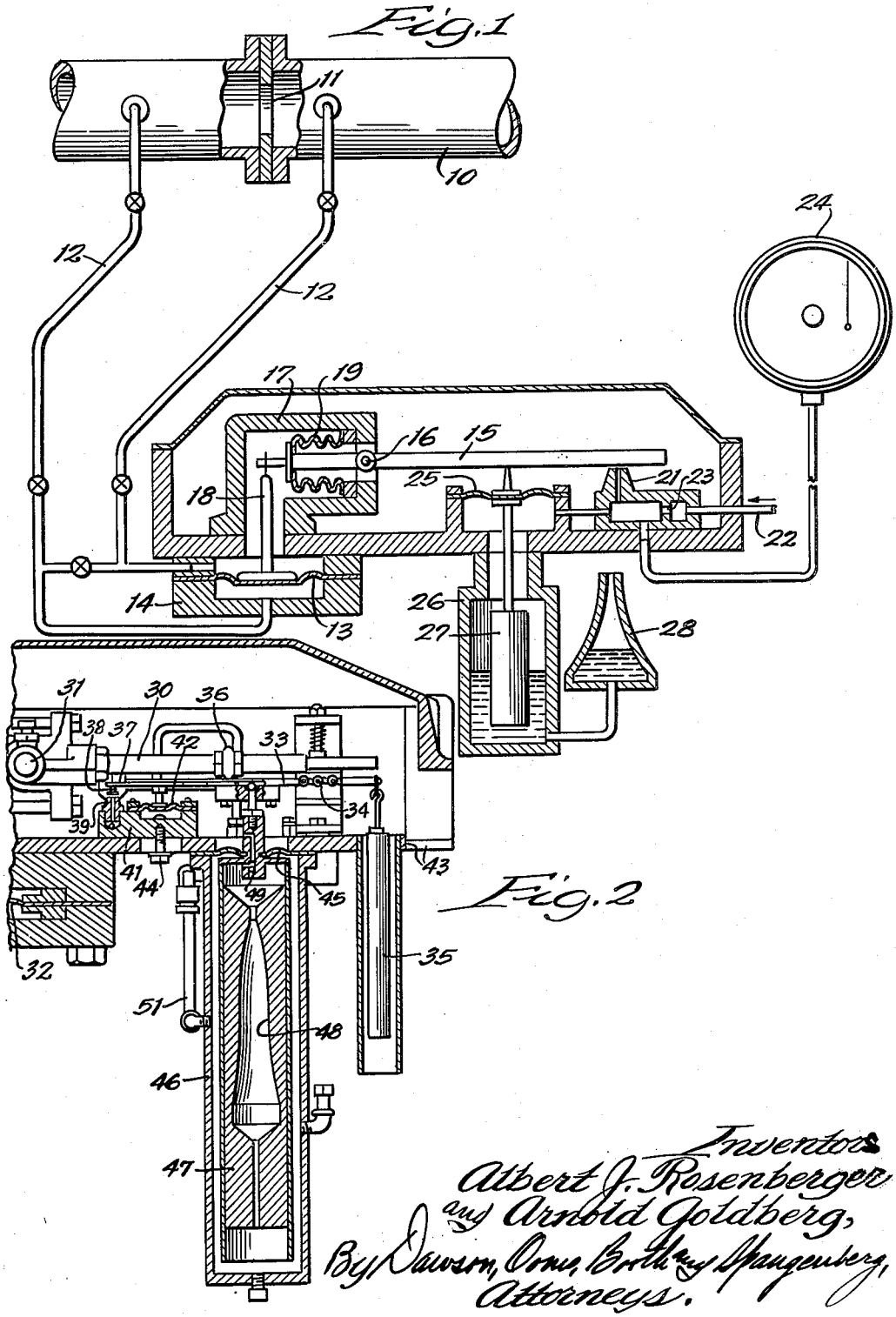

2,626,626

UNITED STATES PATENT OFFICE 2,626,626

INSTRUMENT FOR PRODUCING A REGULATED FORCE RESPONSIVE TO A CONDITION

Albert J. Rosenberger and Arnold Goldberg, Chicago, Ill., assignors to Republic Flow Meters Company, Chicago, Ill., a corporation of Illinois Application August 10, 1948, Serial No. 43,404

13 Claims. (Cl. 137—85)

This invention relates to an instrument for producing a regulated force responsive to a condition and more particularly to an instrument for producing a regulated pressure varying directly with the condition to be measured and the direct measurement of which produces a force responsive to a non-linear function.

In measuring conditions which produce a non-linear response, difficulty is encountered in obtaining accurate measurements and accurate response in the lower part of the instrument range. For example, in measuring flow by measuring the differential pressure across an orifice, the pressure differential varies with the square of the flow so that the differential becomes very small in the vicinity of zero flow. Furthermore, it is desirable for control and indicating to have a linear response for ease of reading and control operations. It is the principal object of the present invention to provide an instrument overcoming these difficulties.

It is another object of the invention to provide an instrument which will give an accurate linear response to variations in the condition throughout the full operating range.

Still another object is to provide an instrument in which the regulated force or pressure may have any desired value when the condition is at its zero value.

Still another object is to provide an instrument which is so controlled as to prevent overshooting and hunting in response to changes in the condition.

A further object is to provide a pressure producing instrument which can employ a simple linear nozzle without introducing any error.

The above and other objects and advantages of the invention will be more readily apparent when read in connection with the accompanying drawing, in which—

Figure 1 is a diagrammatic view with parts in section of an instrument embodying the invention; and Figure 2 is a partial view similar to Figure 1 of an alternative construction.

The instrument, as shown, is of the type more particularly described and claimed in my prior Patents Nos. 2,354,423 and 2,408,685 and is illustrated for measuring or controlling fluid flow, although it is equally applicable to the measurement and control of many other types of physical conditions.

As shown, the instrument will measure the flow of fluid through a pipe 10 provided with an orifice 11. Conduits 12 are connected to the opposite sides of the orifice and lead to the opposite sides of a flexible measuring diaphragm 13 enclosed in a housing 14. As is well understood in the art, the differential pressure across the diaphragm and accordingly the force exerted by the diaphragm is proportional to the square of the flow rate.

The diaphragm is connected to one end of a balance lever or beam 15 pivoted at 16 and extending into a housing 17 which forms a continuation of the housing 14. The inner end of the beam 15 is connected to the diaphragm 13 by a rod 18, and the beam is sealed in the housing by a flexible seal 19 which may be constructed in accordance with my Patent No. 2,299,719. When the flow is from left to right, as seen in Figure 1, the diaphragm 13 will exert a force on the beam tending to rock it clockwise and which is proportional to the square of the flow.

The outer end of the beam approaches and recedes from a nozzle 21 which is supplied with air through a supply pipe 22 and a restriction 23. With this construction the pressure behind the nozzle will be regulated by the movement of the beam. This pressure may be conducted to a suitable indicating, recording or controlling instrument shown generally as a recorder 24 and may also be conducted to the lower side of a flexible reaction diaphragm 25 which is connected to the beam 15 to exert a balancing force thereon. With the instrument as so far described, a regulated pressure will be produced which is proportional to the force of the diaphragm 13 and which accordingly varies with the square of the flow.

In order that the instrument may produce a regulated pressure linearly related to the flow, a chamber 26 is provided opening into the space below the diaphragm 25 and adapted to contain a liquid such as mercury. A displacer 27 is mounted in the chamber and is connected to the diaphragm 25 to exert a force thereon which will vary with the level of liquid in the chamber. At its bottom the chamber 26 communicates with a second chamber 28 vented to atmosphere at its top and which according to the invention is of variable section throughout its vertical length. The exact shape of the chamber 28 will vary with the type of instrument and may be calculated according to the desired change of buoyancy of the displacer.

In normal operation when the flow is zero, no force is exerted by the diaphragm 13, and the liquid level in the chambers 26 and 28 is equal. At this time the weight of the displacer acting on the diaphragm 25 is minimum and may be so calibrated as to become zero. In this case no pressure is required beneath the diaphragm 25 to balance the beam so that the regulated pressure will be zero. If desired, the displacer can be so constructed that it will exert a downward force on the diaphragm 25 under zero conditions so that a pressure is required beneath the diaphragm to balance the weight of the displacer. In this way any desired value of the regulated pressure can be obtained under zero conditions to operate the measuring or control mechanism.

As the flow increases, the diaphragm 13 exerts an increasing upward force tending to rock the beam 15 clockwise to restrict the nozzle 21. This causes a rise in the regulated pressure tending to urge the diaphragm 25 upward and at the same time forcing liquid from the chamber 29 into the chamber 28 so that the displacer loses buoyancy and has a greater effective weight urging the diaphragm 25 downward. Therefore, a higher value of the regulated pressure must be produced to balance the instrument than would be the case if the displacer were not present.

The chamber 28 will obviously be properly shaped to produce the desired loss of buoyancy of the displacer in accordance with a proper function to balance the non-linear effect of the diaphragm 13 so that the regulated pressure may respond linearly to a change in the condition. For example, with a flowmeter, as shown, the force of the diaphragm 13 will be equal to $KX^2$ where K is a constant and X is a flow rate, and the chamber 28 will be so shaped that the buoyancy loss of the displacer will be equal to $KX$ minus $KX^2$. When these two equations are algebraically added, it will be seen that the regulated pressure producing the rebalancing force on the diaphragm 25 must be equal to $KX$ so that the regulated pressure is a linear function of the flow. For other non-linear conditions the chamber will be appropriately shaped to produce the same effect.

Since the regulated pressure follows a linear curve, it will be apparent that the instrument can go to zero accurately and can produce equally accurate measurements throughout the full operating range. Furthermore, since the change in regulated pressure is linear, the diaphragm effect of the nozzle is also linear and becomes merely additive to the diaphragm 25 but does not effect its accuracy. Furthermore, by restricting the atmospheric vent in the top of the chamber 28 the rate of liquid flow between the chambers 27 and 28 can be controlled to produce a damping or anticipating effect preventing overshooting and hunting.

Figure 2 illustrates a portion of a practical instrument design operating on the same principles as described above in connection with Figure 1. As shown, a main beam 30 is pivoted at 31 and is urged clockwise by a measuring diaphragm 32. A second beam 33 pivoted at 34 lies parallel to and beneath the beam 30 and is counterbalanced by a weight 35 at its outer end. The beam 30 carries an adjustable collar or ring 36 which bears against the top of the second beam 33 and which can be adjusted to calibrate the instrument. At its outer end the second beam 33 adjustably carries an extension 37 which carries a valve button 38 at its outer end to cooperate with a nozzle 39. The nozzle is carried by a diaphragm chamber 41 closed at its top by a diaphragm 42 which is connected to the beam extension 37. The diaphragm chamber 41 is supported on a base plate 43 of the instrument by means of a bolt 44 extending through a slot in the base plate. When the diaphragm chamber is shifted parallel to the beam 33, the extension 37 will move with it thereby to change both the effective length of the beam acted on by the diaphragm 42 and the effective distance of the nozzle from the beam pivot. By this adjustment and by the adjustment of the collar 36 the instrument can be accurately calibrated for any desired condition.

The base plate is formed with an opening beneath the beam 33 closed by a flexible diaphragm 45 which is held in place by a vertically elongated casing 46 adapted to contain a liquid such as mercury. A hollow displacer 47 is mounted in the casing 46 and is formed with an opening in its bottom communicating with the chamber. Above the opening the hollow interior of the displacer is shaped as indicated at 48 according to a desired function of the condition to be measured as explained in connection with the chamber 28 of Figure 1. The displacer is connected to the diaphragm 45 and in turn to the second beam 33 by a hollow post which provides a vent passage for the interior of the displacer. Preferably the vent passage is relatively small and includes an upwardly opening check valve 49 plus a bypass around the check valve. The valve 49 is normally open as shown to vent air but if the mercury should rise to the valve level, the valve will float to a closed position to close the vent and prevent loss of mercury. To produce a flow of liquid from the chamber into the displacer the chamber is connected through a pipe 51 with the diaphragm chamber 41 which is in turn connected to the nozzle 39. It will be understood that the nozzle 39 is supplied with compressed air through a restriction as in Figure 1. In operation of the construction of Figure 2, the diaphragm 32 will tend to rock the beam 30 clockwise, and the beam 30 acting through the collar 36 will tend to depress the left end of the beam 33 to rock it counter-clockwise. The nozzle disc 38 will then approach the nozzle 39 to produce an increase in the regulated pressure which acts on the diaphragms 42 and 45 to urge the beam 33 upward and rebalance the instrument. At the same time the pressure causes liquid to be displaced from the chamber 46 into the hollow displacer thereby increasing the effective weight of the displacer so that a higher regulated pressure will be required to rebalance the instrument than would be the case if the displacer were not employed. With the chamber 48 properly shaped the regulated pressure will follow a straight line function of the condition as explained above.

While two embodiments of the invention have been shown and described in detail herein, it will be understood that these are illustrative only and are not to be taken as a definition of the scope of the invention, reference being had for this purpose to the appended claims.

What is claimed is:

1. An instrument for producing a regulated force in response to a condition comprising a balance beam, means responsive to the condition to urge the beam in one direction, means controlled by movement of the beam to produce a regulated force, means directly responsive to the regulated force to urge the beam in the other direction, a chamber to contain liquid, a liquid displacer in the chamber operatively connected to the beam, and means responsive to the regulated force to vary the liquid level in the chamber thereby to vary the effect of the displacer.

2. An instrument for producing a regulated force in response to a condition comprising a balance beam, means responsive to the condition to urge the beam in one direction, means controlled by movement of the beam to produce a regulated force, means directly responsive to the regulated force to urge the beam in the other direction, a pair of inter-connected chambers adapted to contain liquid, one of the chambers being of varying cross section throughout its height, and a displacer movable in one of the chambers and connected to the beam, the regulated force causing liquid to flow from one to the other of the chambers thereby to vary the effect of the displacer.

3. An instrument for producing a regulated force in response to a condition comprising a balance beam, means responsive to the condition to urge the beam in one direction, means controlled by movement of the beam to produce a regulated force, means directly responsive to the regulated force to urge the beam in the other direction, a chamber to contain liquid, a hollow displacer in the chamber communicating therewith for flow of liquid therebetween, and a connection from the displacer to the beam, the regulated force causing liquid to flow from the chamber into the hollow displacer on the beam.

4. An instrument for producing a regulated pressure in response to a condition comprising a balance beam, means responsive to the condition to urge the beam in one direction, valve means controlled by the beam to produce a regulated pressure, a device responsive to the regulated pressure to urge the beam in the other direction, a chamber adapted to contain liquid, a displacer in the chamber connected to the beam, and a connection from the valve means to the chamber to vary the liquid level therein in response to the regulated pressure.

5. An instrument for producing a regulated pressure in response to a condition comprising a balance beam, means responsive to the condition to urge the beam in one direction, valve means controlled by the beam to produce a regulated pressure, a device responsive to the regulated pressure to urge the beam in the other direction, means providing a pair of interconnected chambers adapted to contain liquid, a displacer movable in one of the chambers and connected to the beam, at least one element of the group including the chambers and the displacer being of varying cross section vertically, and a connection from the valve means to one of the chambers to vary the liquid levels in the chambers in response to the regulated pressure.

6. An instrument for producing a regulated pressure in response to a condition comprising a balance beam, means responsive to the condition to urge the beam in one direction, valve means controlled by the beam to produce a regulated pressure, a device responsive to the regulated pressure to urge the beam in the other direction, a chamber adapted to contain liquid, a hollow displacer in the chamber communicating at its bottom therewith and connected to the beam, and a connection from the valve means to the chamber to control the liquid levels in the chamber and displacer in response to the regulated pressure.

7. An instrument for producing a regulated pressure in response to a condition comprising a balance beam, means responsive to the condition to urge the beam to produce a regulated pressure, a device responsive to the regulated pressure to urge the beam in the other direction, a chamber adapted to contain liquid, a hollow displacer in the chamber communicating at its bottom therewith and connected to the beam, the interior of the displacer varying vertically in cross sectional area, and a connection from the valve means to the chamber to supply regulated pressure to the chamber.

8. An instrument for producing a regulated pressure in response to a condition comprising a balance beam, means responsive to the condition to urge the beam in one direction, valve means controlled by the beam to produce a regulated pressure, a device responsive to the regulated pressure to urge the beam in the other direction, a chamber adapted to contain liquid, a hollow displacer in the chamber communicating at its bottom therewith and connected to the beam, an outwardly opening check valve venting the interior of the displacer to atmosphere, means forming a restricted bypass around the valve, the check valve being less dense than the liquid in the chamber to float to closed position when the liquid rises in the hollow displacer to the level of the valve, and a connection from the valve means to the chamber to supply regulated pressure thereto.

9. An instrument for producing a regulated pressure in response to a condition comprising a balance beam, means responsive to the condition to urge the beam in one direction, valve means controlled by the beam to produce a regulated pressure, a device responsive to the regulated pressure to urge the beam in the other direction, said device including a chamber adapted to contain liquid, a flexible diaphragm closing the top of the chamber and connected to the beam, a displacer in the chamber connected to the diaphragm, means forming a second chamber communicating with the first named chamber, and a connection from the valve means to the first named chamber to supply regulated pressure thereto.

10. An instrument for producing a regulated pressure in response to a condition comprising a balance beam, means responsive to the condition to urge the beam in one direction, valve means controlled by the beam to produce a regulated pressure, a device responsive to the regulated pressure to urge the beam in the other direction, said device including a chamber adapted to contain liquid, a flexible diaphragm closing the top of the chamber and connected to the beam, a hollow displacer in the chamber communicating at its bottom therewith and connected to the diaphragm, there being an atmospheric vent passage from the interior of the displacer through the diaphragm, and a connection from the valve means to the chamber to supply regulated pressure thereto.

11. An instrument for producing a regulated pressure in response to a condition comprising a first pivoted beam, means responsive to the condition to urge the beam in one direction, a second beam parallel to the first beam and pivoted on an axis parallel to and spaced from the pivotal axis of the first beam, means connecting the beams for transmission of force therebetween, valve means controlled by the beams to produce a regulated pressure, a first reaction device responsive to the regulated pressure and connected to the second beam to urge it in the other direction, a second reaction device responsive to the regulated pressure and connected to the second beam to urge it in the other direction, and means mounting the second reaction device for adjustment lengthwise of the second beam.

12. An instrument for producing a regulated pressure in response to a condition comprising a first pivoted beam, means responsive to the condition to urge the beam in one direction, a second beam parallel to the first beam and pivoted on an axis parallel to and spaced from the pivotal axis of the first beam, means connecting the beams for transmission of force therebetween, a hollow diaphragm casing mounting adjacent the second beam for adjustment substantially parallel thereto, a diaphragm carried by the diaphragm casing and connected to the second beam, a nozzle carried by and communicating with the diaphragm chamber, the nozzle being variably restricted by the beam to produce a regulated pressure in the diaphragm chamber.

13. An instrument for producing a regulated pressure in response to a condition comprising a first pivoted beam, means responsive to the condition to urge the beam in one direction, a second beam parallel to the first beam and pivoted on an axis parallel to and spaced from the pivotal axis of the first beam, means connecting the beams for transmission of force therebetween, a hollow diaphragm casing mounted adjacent the second beam for adjustment substantially parallel thereto, a diaphragm carried by the diaphragm casing and connected to the second beam, a nozzle carried by and communicating with the diaphragm chamber, the nozzle being variably restricted by the beam to produce a regulated pressure in the diaphragm chamber, a second chamber adapted to contain liquid, a diaphragm closing the second chamber and connected to the second beam, a displacer in the second chamber connected to the second beam, and a connection from the diaphragm chamber to the second chamber to supply regulated pressure to the second chamber.

ALBERT J. ROSENBERGER.
ARNOLD GOLDBERG.

REFERENCES CITED

The following references are of record in the file of this patent:

UNITED STATES PATENTS

| Number | Name | Date |
|---|---|---|
| 1,132,399 | Simpson | Mar. 16, 1915 |
| 1,257,965 | Bailey | Mar. 5, 1918 |
| 1,638,102 | Roucka | Aug. 9, 1927 |
| 1,900,823 | Lang | Mar. 7, 1933 |
| 2,409,435 | Ketay | Oct. 15, 1946 |
| 2,423,394 | Lee | July 1, 1947 |
| 2,436,451 | Rosenberger | Feb. 24, 1948 |
| 2,450,884 | Dawson | Oct. 12, 1948 |

FOREIGN PATENTS

| Number | Country | Date |
|---|---|---|
| 521,011 | Germany | Mar. 16, 1931 |
| 536,537 | Great Britain | Dec. 12, 1940 |